Sept. 2, 1930.  J. C. CALL  1,774,501
MECHANICAL MOVEMENT
Filed Nov. 12, 1928
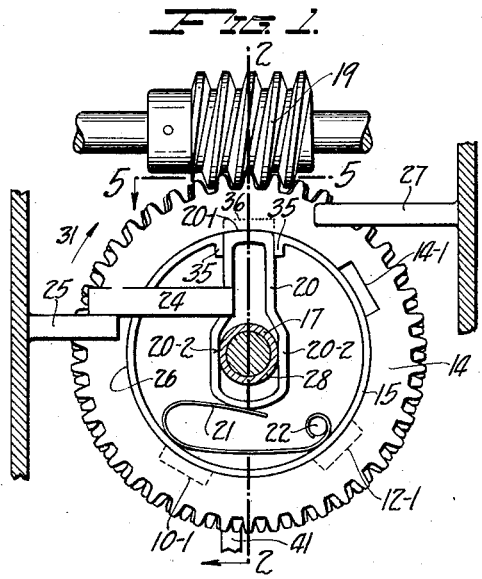
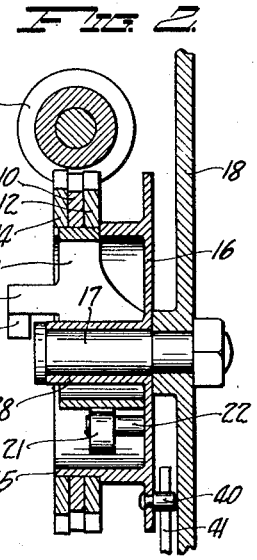
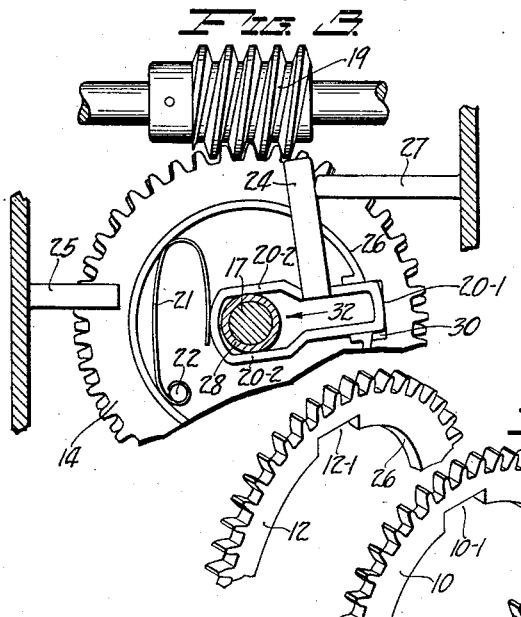
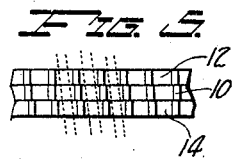
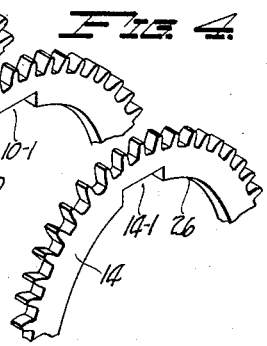
Inventor
J. C. CALL,
By
Attorney Patented Sept. 2, 1930

1,774,501

UNITED STATES PATENT OFFICE

JOSEPH C. CALL, OF BANCROFT, IDAHO

MECHANICAL MOVEMENT

Application filed November 12, 1928. Serial No. 318,814.

This invention relates to a mechanical movement, and its principal objects are to provide a device which shall:

First, measure off mechanically predetermined motion intervals.

Second, be applicable to cause the functioning of other mechanism at predetermined motion intervals.

Third, be simple, positive and reliable in its action.

Fourth, be comparatively inexpensive.

In many kinds of mechanism it frequently becomes desirable to cause the functioning of the mechanism or certain parts thereof, in certain motion periods. For example, it might be required that an electric motor after being started, should continue running until it has made substantially a predetermined number of revolutions, and then, that there be a period of rest. In such a case, the present invention finds a typical application, and a simple form of my device comprises two or more toothed wheels mounted for independent rotary motion side by side along a common axis of rotation.

Each of the wheels has a different number of teeth, varying from one another, preferably by one or two teeth. These toothed wheels or gears are in mesh in common with a single driver. The result is that when the gear having the least number of teeth makes one complete revolution, then the other gears of the group will each fall short of making one complete revolution by an amount which is equal to the circumferential distance occupied by the excess number of teeth and spaces of such gears over and above the number in the first gear.

Assuming an illustrative case where two gears are employed, the second gear having one tooth more than the first gear, and the two gears being simultaneously in mesh with a driving worm having a simple thread. Naturally, the first gear would have $n$ teeth, and the second, $n$ plus 1 teeth. While the first gear makes one revolution, the second gear lacks one tooth and one space of making one full revolution. Therefore, if the two gears stand mutually in a given circumferential relation to each other in the beginning, then at the end of $n$ revolutions of the worm, they will have moved circumferentially with respect to each other, a distance equal to one tooth and one space. At the end of $2n$ revolutions of the worm, the two gears will have moved past each other a distance equal to two teeth and two spaces, and so on, until the number of revolutions of the worm is equal to the number of teeth in the second gear multiplied by the number of teeth in the first gear, at which time the two gears shall again stand in exactly the same circumferential relation as in the beginning. By providing on the two wheels, portions which come into conjunction, and also providing a coacting member engaging the said portions when these are in conjunction, it becomes possible to make the occurrence of such conjunction, the dominating factor to cause certain other mechanical actions.

By varying the number of wheels, the number of teeth in the wheels, the number of portions which come into conjunction, and/or the number of threads on the worm, or by using a gear in place of the worm, numerous useful period-defining combinations may be obtained.

The features of this invention for which the protection of Letters Patent is desired, are collectively grouped in the claims concluding this specification.

In the drawing, which illustrates, somewhat in diagram, merely one embodiment of this invention, Fig. 1 represents a side elevation, parts broken away;

Fig. 2, a section taken on line 2—2, Fig. 1;

Fig. 3, a fragmentary portion of Fig. 1 showing a part in an alternate position;

Fig. 4, a fragmentary exploded view in perspective; and

Fig. 5, a fragmentary plan viewed from line 5—5, Fig. 1.

Referring to the drawing, the numeral 10 indicates a toothed ring or gear having, for instance, forty teeth, while 12 and 14 indicate other toothed rings or gears having respectively forty-one and forty-two teeth. These three gears are rotatably mounted side by side on the circular flange 15 projecting from the face of the disk 16. The disk has the hub sleeve 28 rotatably mounted on the pin 17, which may be fixed in a wall of a stationary housing 18.

Meshing simultaneously with the gears 10, 12 and 14, is the single thread worm 19. It will be noted in Fig. 2, that the three gears form virtually a composite worm wheel, of which the component gears may be regarded as slices whose planes are perpendicular to the axis of rotation, each slice being movable against the next one.

There enters here a mechanical inconsistency, because it is obviously not possible to have a number of gears, each with a different number of teeth of a certain pitch, rotating about the same axis and in the proper theoretical mesh with one and the same worm. As a matter of fact, the actual pitch diameter of each one of the gears is different from the others, but this difference is slight, and can practically be neglected so far as a satisfactory working of the assemblage is concerned, because the number of teeth in each gear is chosen large enough and the pitch of the teeth made small enough, so that the resulting differences in the pitch diameters of gears are immaterial.

Where a high degree of mechanical perfection is not required, the individual gear slices may be cut in the usual manner and these be assembled to form the worm wheel. The teeth of the worm wheel, where they mesh with the worm, appear substantially as shown in Fig. 5. If greater mechanical refinement is desired, each of the gear slices may be preliminarily cut with the respective required number of teeth, and the gear slices be then placed together as required for the worm gear, this being cut by means of a hob much after the usual manner, with a differential motion however, between the gear slices in the planes thereof, inasmuch as these are constrained to follow the thread or threads of the hob.

In the composite worm wheel, its respective sectional parts or slices will necessarily be rotated in a constantly changing angular relationship to one another when engaged by the driving worm, owing to the unequal number of teeth in the different sectional parts.

The respective sectional worm wheel parts 10, 12 and 14 have defined therein the notches $10^1$, $12^1$ and $14^1$, which notches, in the stationary position of the apparatus, are in conjunction, and form a seat engageable by a dog 20. This dog is slidable radially, and when the apparatus is not functioning, is held in the locked position by a spring 21, the spring being mounted on a stationary pin 22. The dog may carry a contact member, such as the arm 24, the purpose of which will presently become clear.

The manner in which this device functions will now be described. Supposing the worm 19 to be rotating so as to turn the composite worm wheel, whose component sections lie substantially in planes adjacent one another, in the direction of the arrow 31, and supposing the notches $10^1$, $12^1$, $14^1$, for the moment, to be in non-conjunctive positions, as indicated in Fig. 1. Now, as the motion continues, the said notches will finally be brought into conjunction at a definite circumferential point, such as 36 in Fig. 1, just above the dog 20.

Meanwhile, the face $20^1$ of the dog will ride against the journal surface 26, due to the pressure exerted by the spring 21, but as soon as the stated conjunction of the notches occurs, the dog will be forced into its seat and is then carried forward by the rotating composite worm wheel to the position shown in Fig. 3. A moment after reaching this last position, the arm 24 is acted upon by the kick-out stop 27, which pushes the dog inwardly as indicated by the arrow 32, thus releasing it from engagement with the composite worm wheel. From here the dog may be returned by hand, or by other convenient means, to its normal position ready for the next engagement with the composite worm wheel.

In its angular travel about the axis 34, the dog is accompanied by the disk 16, inasmuch as the dog is confined by the guide portions 35 of the disk, and by its own guide portions $20^2$, which latter are in slidable contact with the hub sleeve 28. This arrangement also provides the necessary radial guidance for the dog.

The motion period of this device is determined by the movement of the component gear sections from one conjunction to the next and the actuating effect of the device may be utilized when the dog 20 is moved by the composite gear from one position to the other.

Motion from the disk 16 may be utilized for the periodic actuation of other devices, such as electrical switches and for numerous purposes which will readily occur to a skilled designer. To transmit the motion from the disk to such other devices, any well known mechanical elements may be employed, such as the pin 40 acting against an arm 41.

It should be noted that the notches 10, 12, 14, begin moving past one another, or staggering, as soon as they leave the conjunctive position indicated at 36. Therefore, when the gear sections are engaged by the dog, as the latter moves outwardly from its position in Fig. 1, it is necessary that a certain leeway be provided to allow the teeth of the various gear sections to accommodate themselves to the threads of the worm, while the dog is traveling from the position just mentioned, to the kick-out position indicated in Fig. 3. This leeway may be obtained by making the width of the notches 10¹, 12¹, 14¹ enough greater than the width of the dog, as indicated at 30, Fig. 3, that there will be no conflict between any of the composite worm wheel teeth and the threads of the worm during the movement of the locked worm wheel sections from the position indicated in Fig. 1 to the position indicated in Fig. 3.

It will be understood of course, that the notches 10¹, 12¹, 14¹, in moving around the circumference of the flange 15, from one conjunction to another, do so in continually changing circumferential relationship, so that the dog 20 is compelled to remain in the position shown in Fig. 1 until such a conjunction occurs, at which time the small radially outward movement occurs, causing the dog to enter the conjunctioned notches. The engaged dog is moved away from its initial position (Fig. 1), carrying with it the disk 16, and in turn, the pin 40 and arm 41. Any well known mechanism (not shown) such as an electric switch and motor, may be thereby influenced to cut off the rotative motion of the worm.

The entire mechanism then remains at rest until such a time as motion is again imparted to the worm, which causes the dog to be moved to the disconnecting position, just beyond that indicated in Fig. 3, a previously explained, the motion continuing to complete another cycle lasting until the arm 41 is again pushed over.

While a specific embodiment of this invention is herein shown and described, it is to be clearly understood that all the detailed parts thereof, may or may not be shown in the preferred forms, and further, that the preferred forms may be varied from time to time as the development of this invention and the arts to which it appertains, advance. Therefore, the essential and characteristic features of this invention will be readily discernible from the claims in which its spirit is generalized.

Having fully described my invention, what I claim is:

1. A mechanical movement comprising a plurality of gears, every gear of said plurality having a number of teeth different from the number in any of the other said gears, means deriving motion from said gears every time said gears come into a predetermined recurring conjunction with one another, and a driver in common operative upon said gears.

2. A mechanical movement comprising a plurality of gears, every gear of said plurality having a number of teeth different from the number in another gear of said plurality, a worm simultaneously in mesh with all said gears, and means deriving motion from said gears at recurring conjunctions thereof.

3. A mechanical movement comprising a plurality of gears lying substantially in planes of rotation adjacent one another and having an axis of rotation in common, each of the said gears having a number of teeth different from the number of teeth in the others of said plurality, and a driver simultaneously in mesh with all the said gears.

4. A mechanical movement comprising a worm wheel composed of a plurality of slices defined by planes substantially parallel to the plane of rotation, said slices having various pitch diameters and various numbers of teeth of equal pitch, but the same axis of rotation, and a worm substantially in mesh with said worm wheel.

5. A mechanical movement comprising a composite worm wheel having a plurality of toothed sections transverse to the axis thereof, the numbers of teeth in the various sections and the pitch diameters thereof differing from one another while the pitch of all the teeth is the same, and a worm substantially in mesh with said worm wheel.

6. A mechanical movement comprising a plurality of gear sections defined substantially by planes perpendicular to the axis of rotation, every one of said gear sections having a number of teeth and pitch diameter different from the number of teeth and pitch diameter in any other of said sections, the pitch being the same, and a driving worm simultaneously in mesh with all the gear sections of the said plurality.

7. A mechanical movement comprising a plurality of gears having a common axis and planes of rotation substantially parallel to one another, each of the said gears having a number of teeth different from the number of teeth in the other gears, a driver simultaneously in mesh with all the gears of the said plurality, engaging portions defined on the said gears, said engaging portions coming into conjunction with one another intermittently, and an engaging member coacting with said engaging portions whenever said conjunction occurs.

8. A mechanical movement comprising a plurality of gear sections having a common axis and defined by planes substantially perpendicular to the axis of rotation thereof, each of the said gear sections having a number of teeth different from the number of teeth in the other sections but of the same pitch, engaging portions defined in the said gear sections, a dog intermittently engaged by said engaging portions, a stop for said dog, a kick-out operative upon said dog, and a driving worm meshing simultaneously with all the said gear sections.

9. In combination, a rotatable member, a plurality of gears rotatable on said rotatable member, said gears varying from one another in numbers of teeth, a worm substantially in mesh with all said gears simultaneously, means for causing engagement between said gears and said rotatable member when said gears are in a certain conjunction, and means for releasing said engaging means.

10. In combination, a rotatable drum, a plurality of gears rotatable on said drum, said gears varying from one another in numbers of teeth, a worm substantially in mesh with all said gears simultaneously, notched portions within said gears, a spring-pressed dog within said drum, said dog positioned to be engaged by said notched portions when in conjunction, and means for releasing said dog.

In testimony whereof, I sign my name hereto.

JOSEPH C. CALL.